US011187620B2

(12) United States Patent
Rossegger et al.

(10) Patent No.: US 11,187,620 B2
(45) Date of Patent: Nov. 30, 2021

(54) METHOD AND DEVICE FOR CONTROLLING THE PRESSURE OF THE EXHAUST GAS OF A MACHINE

(71) Applicant: KRISTL, SEIBT & CO. GESELLSCHAFT M.B.H., Graz (AT)

(72) Inventors: Wolfram Rossegger, Graz (AT); Karl-Gerald Artner, Kobenz (AT)

(73) Assignee: KRISTL, SEIBT & CO. GESELLSCHAFT M.B.H., Graz (AT)

(*) Notice: Subject to any disclaimer, the term of this patent is extended or adjusted under 35 U.S.C. 154(b) by 0 days.

(21) Appl. No.: 16/963,795

(22) PCT Filed: Jan. 22, 2019

(86) PCT No.: PCT/AT2019/060021
§ 371 (c)(1),
(2) Date: Jul. 21, 2020

(87) PCT Pub. No.: WO2019/140477
PCT Pub. Date: Jul. 25, 2019

(65) Prior Publication Data
US 2020/0348210 A1 Nov. 5, 2020

(30) Foreign Application Priority Data
Jan. 22, 2018 (AT) .............................. A 50047/2018

(51) Int. Cl.
G01M 15/10 (2006.01)
F02D 9/04 (2006.01)
(Continued)

(52) U.S. Cl.
CPC ............. G01M 15/106 (2013.01); F01N 3/22 (2013.01); F01N 3/30 (2013.01); F01N 3/32 (2013.01);
(Continued)

(58) Field of Classification Search
CPC ..... F01N 1/14; F01N 3/22; F01N 3/30; F01N 3/32; F01N 9/00; F01N 13/08;
(Continued)

(56) References Cited

U.S. PATENT DOCUMENTS 4,109,462 A 8/1978 Kohama et al.
2015/0369101 A1* 12/2015 Leone ................. F02D 41/0255
123/406.12
(Continued)

FOREIGN PATENT DOCUMENTS

DE 3013444 A1 10/1981
DE 4015818 A1 4/1991
(Continued)

OTHER PUBLICATIONS

ISA European Patent Office, International Search Report Issued in Application No. PCT/AT2019/060021, dated May 21, 2019, WIPO, 2 pages.

*Primary Examiner* — Audrey B. Walter
*Assistant Examiner* — Dapinder Singh
(74) *Attorney, Agent, or Firm* — McCoy Russell LLP

(57) ABSTRACT

The invention relates to a method for controlling the pressure of the exhaust gas of a machine, in particular an internal combustion engine. The exhaust gas is discharged from the machine via an exhaust gas line, and the exhaust gas line has a regulating device, preferably comprising a throttle valve or a throttle flap, said regulating device delimiting a pressure-regulated section of the exhaust gas line. Gas, preferably air, which is regulated into the pressure-regulated section via a compressed gas line is supplied such that the pressure in the pressure-regulated section is substantially kept at a constant value. The invention additionally relates to a corresponding device.

20 Claims, 2 Drawing Sheets

(51) Int. Cl.
*F01N 3/22* (2006.01)
*F01N 3/30* (2006.01)
*F01N 13/08* (2010.01)
*F01N 3/32* (2006.01)

(52) U.S. Cl.
CPC ............... *F01N 13/08* (2013.01); *F02D 9/04* (2013.01); *F01N 2240/36* (2013.01); *F01N 2340/02* (2013.01); *F01N 2340/06* (2013.01); *F01N 2560/08* (2013.01); *F01N 2560/14* (2013.01); *F01N 2590/00* (2013.01); *F01N 2900/1406* (2013.01)

(58) Field of Classification Search
CPC ............ F01N 2240/36; F01N 2340/02; F01N 2340/06; F01N 2560/08; F01N 2560/14; F01N 2590/00; F01N 2900/1406; F02D 9/04; G01M 15/04; G01M 15/106; Y02T 10/12; Y02T 10/40

USPC .......................................................... 60/273
See application file for complete search history.

(56) References Cited

U.S. PATENT DOCUMENTS

| 2018/0128213 A1* | 5/2018 | Fischer | .................. F02M 26/06 |
| 2019/0242332 A1* | 8/2019 | Dwenger | ............... F02M 26/36 |

FOREIGN PATENT DOCUMENTS

| DE | 4320880 A1 | 1/1994 |
| DE | 102015109317 A1 | 12/2015 |
| EP | 1336035 B1 | 4/2015 |
| WO | 0242730 A2 | 5/2002 |
| WO | 2011074668 A1 | 6/2011 |

* cited by examiner

METHOD AND DEVICE FOR CONTROLLING THE PRESSURE OF THE EXHAUST GAS OF A MACHINE

CROSS-REFERENCE TO RELATED APPLICATIONS

The present application is a U.S. National Phase of International Patent Application Serial No. PCT/AT2019/060021 entitled "METHOD AND DEVICE FOR CONTROLLING THE PRESSURE OF THE EXHAUST GAS OF A WORK MACHINE," filed on Jan. 22, 2019. International Patent Application Serial No. PCT/AT2019/060021 claims priority to Austrian Patent Application No. A 50047/2018 filed on Jan. 22, 2018. The entire contents of each of the above-referenced applications are hereby incorporated by reference for all purposes.

TECHNICAL FIELD

The invention pertains to a method for controlling the pressure of the exhaust gas of a machine, particularly an internal combustion engine, wherein the exhaust gas is discharged from the machine via an exhaust gas line and the exhaust gas line has a regulating device, which preferably comprises a throttle valve or a throttle flap and delimits a pressure-controlled section of the exhaust gas line. The invention furthermore pertains to a device for controlling the pressure of the exhaust gas of a machine, particularly an internal combustion engine and especially on a test stand, wherein said device comprises an exhaust gas line that serves for discharging exhaust gas from the machine and has a regulating device, particularly a control butterfly valve or throttle flap, which delimits a pressure-controlled section.

BACKGROUND AND SUMMARY

It is frequently necessary to control the pressure of the exhaust gas being discharged from a machine, particularly an internal combustion engine and especially during the operation on a test stand. This is particularly necessary in instances, in which the exhaust gas is controlled with a control valve or a throttle flap and a fan. Numerous options in this respect are already known.

For example, DE 40 15 818 C2 discloses a test stand for internal combustion engines that comprises a supply air system, which respectively conditions the required combustion air to constantly predefinable conditionality regardless of the ambient conditions and is fluidically connected to the internal combustion engine by means of a supply air line, as well as an exhaust gas system. In this case, the exhaust gas line leading from the exhaust gas manifold of the internal combustion engine to the exhaust gas system has a negligible flow resistance. Furthermore, a control valve is provided in the exhaust gas line upstream of the fan referred to the flow direction, wherein said control valve adjusts an exhaust gas pressure that corresponds to the pressure of the supplied combustion air in the upstream section of the exhaust gas line referred to the flow direction, and wherein the section of the exhaust gas line, which is located downstream of the control valve referred to the flow direction, is maintained at a negative pressure that always suffices for this purpose by means of the fan.

Furthermore, DE 10 2015 109 317 A1 discloses a method for an engine, wherein a position of an exhaust gas check valve is adjusted on the basis of a desired exhaust gas back pressure during a cold start of the engine. An exhaust gas back pressure is determined upstream of the valve and a desired secondary air quantity is supplied into the exhaust gas channel upstream of a catalytic converter on the basis of the exhaust gas back pressure. Furthermore, a fuel injection quantity and an ignition timing are adjusted on the basis of the back pressure.

DE 30 13 444 A1 describes a device that serves for reducing exhaust gas pollutants of an internal combustion engine with a catalytic converter in an engine exhaust gas line for catalytic afterburning, particularly in connection with a secondary air injection. A directional throttle that amplifies negative pressure waves is arranged downstream of the catalytic converter referred to the flow direction in this case and has a low flow resistance in the engine discharge direction and a comparatively higher flow resistance in the engine intake direction.

Furthermore, EP 1 336 035 B1 describes a method for supplying an internal combustion engine with a constant quantity of conditioned combustion gas, wherein combustion gas that is not needed by the internal combustion engine is routed past the internal combustion engine and mixed with its exhaust gas, and wherein the combustion gas/exhaust gas mixture is removed by suction downstream of the internal combustion engine. In addition, a pressure gradient between 0.3 and 5 mbar is adjusted between the conditioned combustion gas and the exhaust gas downstream of the internal combustion engine. The combustion gas quantity made available at any point in time at a junction to the internal combustion engine or a bypass line around the internal combustion engine amounts to the maximum quantity required by the internal combustion engine at any point in time, wherein the combustion gas that is currently not needed by the internal combustion engine is routed past the internal combustion engine via the bypass line.

The disclosed method in fact achieves an approximately constant mass flow across the regulating devices such that the control of these regulating devices is on the one hand relatively simple and the flaps on the other hand never have to be tightly closed. However, the proposed methods have multiple disadvantages. For example, retroactive effects of pressure pulsations from the exhaust gas channel into the intake channel are possible if a bypass line is used. In addition, the mass flow through the bypass line is high at operating points of the internal combustion engine with low exhaust gas flow such that there is a risk of intermixing the exhaust gas and the combustion gas in the exhaust gas channel. This is particularly relevant if exhaust gas analyzers take samples from the exhaust gas channel. Furthermore, the internal combustion engine may take in the hot exhaust gas from the exhaust gas channel via the bypass line such that the internal combustion engine is damaged or its work sequence is adversely affected.

The other methods and devices disclosed in the prior art also have one or more disadvantages. If the pressure control takes place without a bypass line as it is likewise described in the prior art, the respective regulating device on the intake side and/or exhaust gas side has to follow dynamic changes of the internal combustion engine correspondingly fast. However, this can only be achieved to an insufficient degree with the methods known from the prior art due to potential resonances and fluctuations. In addition, the regulating devices have to be correspondingly tight at operating points of the internal combustion engine with low mass flow, for example while coasting, in order to build up and maintain the respective pressure. Although many suitable materials for a tightly closing regulating device, particularly a flap, are available on the intake side due to the relatively low temperatures of the conditioned combustion gas, the high exhaust gas temperatures on the exhaust gas side significantly limit the number of suitable materials. It is even possible that a flap, which does not close tightly and has a certain leakage, is used on the exhaust gas side for reasons of robustness, but this impedes the maintenance of a constant pressure in accordance with the methods known from the prior art.

The invention therefore is based on the objective of eliminating or diminishing the above-described problems and respectively simplifying or improving the maintenance of a constant pressure on the exhaust gas side of a machine, particularly an internal combustion engine.

This is achieved with the method according to claim 1, i.e. a method of the initially described type for controlling the pressure of the exhaust gas of a machine, wherein gas, preferably air, is supplied into the pressure-controlled section via a compressed gas line in a regulated manner such that the pressure in the pressure-controlled section is essentially maintained at a constant value. This is furthermore achieved with the device according to claim 1, i.e. a device of the initially described type, in which the pressure-controlled section has a compressed gas line for supplying gas in a regulated manner.

Gas, preferably air, is supplied in a regulated manner via a compressed gas line in order to easily maintain the pressure in the pressure-controlled section constant and to build up the required pressure, particularly despite a leakage of the regulating device. The compressed gas line therefore has a connection to the exhaust gas line within the pressure-controlled section. Since the compressed gas line can be controlled with respect to the mass flow, the additional mass flow can also be advantageously curtailed entirely as the throughput through the machine increases.

The gas preferably is supplied at a beginning of the compressed gas line under a pressure that is higher than the pressure of the exhaust gas in the exhaust gas line, particularly higher than the pressure within the pressure-controlled section. It is particularly preferred that the pressure at the beginning of the compressed gas line is higher than the pressure of the exhaust gas in the exhaust gas line, particularly the pressure within the pressure-controlled section, by more than 50 mbar, especially more than 100 mbar. It is likewise preferred that the supplied gas is regulated with a valve and/or a throttle, which preferably are respectively controlled manually and/or electrically. It is furthermore preferred that the mass flow is made available by a building pressure line, another gas source or another compressor. These characteristics are advantageous for respectively building up the required pressure in the pressure-controlled section of the exhaust gas line or for maintaining the pressure in the pressure-controlled section as constant as possible in a simple manner, namely also at a low mass flow, and/or for easily regulating the mass flow.

In a preferred embodiment of the method, the gas is supplied with a mass flow that is lower than the mass flow of the exhaust gas discharged in the maximum operating mode of the machine, wherein the mass flow preferably amounts to less than 10 percent, particularly less than 5 percent, of the mass flow of the exhaust gas discharged in the maximum operating mode of the machine. The control of the mass flow of the compressed gas line with a valve and/or a throttle particularly makes it possible to maintain this mass flow at a low value.

Due to the potentially high temperatures of the exhaust gas of the machine, it may be difficult to operate a tightly closing regulating device. It may therefore be preferable, particularly for reasons of robustness, to use a regulating device that does not close tightly and has a certain leakage. In a preferred embodiment, the regulating device is therefore operated in a mode, in which a mass flow can constantly escape from the pressure-controlled region, wherein the mass flow preferably amounts to between 1 and 5 percent, particularly between 1 and 2 percent, of the mass flow of the exhaust gas discharged in the maximum operating mode of the machine. The mass flow from the compressed gas line preferably does not serve for changing the pressure ratios in the pressure-controlled region, but particularly for compensating a constant mass flow through the regulating device or a leakage of the regulating device, respectively. Furthermore, the mass flow from the compressed air line can contribute to a permanent minimum throughput on the regulating device such that a more stable control in the neutral point of the regulating device is ensured.

It is advantageous that the compressed gas line is connected to the pressure-controlled section in the vicinity of the regulating device, particularly if the mass flow from the compressed air line should contribute to a minimum throughput through the regulating device or compensate a constant mass flow through this regulating device and/or if the mass flow from the compressed air line should not substantially change the pressure ratios or only serve for maintaining the pressure constant. It is proposed that the compressed gas line supplies the gas into the respective quarter, preferably the respective eighth, of the pressure-controlled section, which is located closer to the regulating device than to the machine, and/or into a region that is spaced apart from the regulating device by less than 30 cm, preferably less than 10 cm.

The compressed gas line preferably has a correspondingly high flow resistance such that the mass flow from the compressed gas line can be maintained low despite the high pressure difference between the beginning of the compressed gas line and the pressure of the exhaust gas in the exhaust gas line, particularly within the pressure-controlled section. The flow resistance preferably should be so high that the mass flow from the compressed gas line into the pressure-controlled section amounts at a pressure difference of more than 50 mbar to less than 10 percent, preferably less than 5 percent, of the exhaust gas discharged in the maximum operating mode of the machine. It is particularly preferred that the flow resistance is so high that the mass flow from the compressed gas line into the pressure-controlled section amounts at a pressure difference of more than 100 mbar to less than 10 percent, preferably less than 5 percent, of the exhaust gas discharged in the maximum operating mode of the machine. It is likewise preferred that the compressed gas line has a correspondingly small diameter such that the mass flow from the compressed gas line is maintained low despite the high pressure difference, wherein the diameter preferably is so small that the preferred and particularly preferred characteristics mentioned in connection with the flow resistance are achieved.

It is frequently necessary to control the pressure of the combustion gas being supplied to a machine, particularly an internal combustion engine and especially during the operation on a test stand. This is particularly necessary in instances, in which the combustion gas is additionally conditioned with a high-pressure fan, a gas conditioning section, particularly an air conditioning section, a discharge valve, a throttle flap and a pressure sensor. Numerous options in this respect are also already known.

Preferred embodiments of the invention therefore are based on the objective of also eliminating or diminishing the aforementioned problems with respect to the supply gas and of also respectively simplifying or improving the maintenance of a constant pressure on the supply gas side of a machine, particularly an internal combustion engine.

In a preferred embodiment of the method, a combustion gas, preferably air, is supplied to the machine via a supply line and the supply line likewise has a regulating device, which preferably comprises a throttle valve or a throttle flap and delimits a pressure-controlled section of the supply line. In this case, gas is conveyed from a section of the supply line, which is located upstream of the regulating device of the supply line, to the pressure-controlled section of the exhaust gas line via the compressed gas line. It is furthermore particularly preferred that a first gas conveying device, preferably a high-pressure fan, blows the combustion gas into the supply line and generates an admission pressure, that the combustion gas is conditioned with respect to the temperature and/or humidity in an air conditioning section and/or that the exhaust gas in the exhaust gas line is removed by suction with the aid of a second gas conveying device, preferably a fan. For example, the gas conveying device of the supply line therefore can also be used for making available the gas in the compressed gas line.

The problem of intermixing the exhaust gas and the combustion gas in the exhaust gas line, which may arise due to a bypass line of the type disclosed in EP 1 336 035 B1, particularly at operating points of the machine with a low exhaust gas mass flow, does not exist in this embodiment because the mass flow through the compressed air line is significantly lower than in a bypass line that would connect the respective pressure-controlled sections of the supply gas line and the exhaust gas line. Furthermore, retroactive effects of pressure pulsations from the pressure-controlled section of the supply line into the pressure-controlled section of the exhaust gas line can be prevented. This inventive embodiment also advantageously prevents the machine from taking in hot exhaust gas from the exhaust gas line in case of a fault as it could occur when a bypass line is used, wherein damages to the machine or adverse effects on its work sequence can thereby be prevented.

Combustion gas, which is not needed by the machine, is advantageously discharged from the supply line, preferably in a region located upstream of the regulating device of the supply line, by means of a discharge valve. Among other things, the use of such a discharge valve can simplify the control of the pressure in the pressure-controlled section of the supply line.

In a preferred embodiment, the pressure in at least one of the respective pressure-controlled section is measured at more than one location, preferably at three locations.

It would basically be advantageous to measure the pressure in the vicinity of the respective regulating device because changes of the regulating device immediately affect the pressure downstream of the regulating device. However, the change of the adjustment of the regulating device not only causes a locally limited pressure change, but also a pressure wave that propagates with the sonic velocity of the gas. This pressure wave is reflected on the machine and once again reaches the regulating device or the pressure sensor after the double transit time. If the control reacts to this pressure wave with a flap change, the control excites an oscillation that corresponds to the first or a higher resonant frequency of the pressure-controlled section, e.g. a pipe. In an air-filled pipe with a length of 6 m, the first resonant frequency may at room temperature amount, for example, to approximately 29 Hz.

Multiple options would be available for preventing the control from exciting these resonant frequencies. For example, the control could be adjusted so slowly that it does not even react to the first resonant frequency. However, this generally means an excessively slow control adjustment. In addition, corresponding stop filters or comb filters could be provided for the measured pressure value. However, this requires information on the exact resonant frequencies that, among other things, depend on the temperature and the pipe length. Furthermore, a pressure sensor could be used in the center of the pressure-controlled section because a standing wave of the first resonance has a node at this location. In this way, the first resonance on the pressure sensor is canceled and the control can be adjusted correspondingly faster, but it can no longer react to even the second resonant frequency. One of these options or a combination thereof could also be realized in the inventive method.

However, the effects of resonances, fluctuations and pressure waves on the pressure measurement can be diminished or largely prevented by measuring the pressure at more than one location. The pressure measurement at just three locations makes it possible to largely eliminate the aforementioned interfering factors with little effort.

In a preferred embodiment of the method, the pressure in the respective pressure-controlled section is adjusted by controlling the regulating device on the basis of a preferably weighted arithmetic average value of the pressures measured at multiple locations in the pressure-controlled section, wherein the pressure in the respective pressure-controlled section preferably is essentially maintained constant. The resonant frequency, which limits the bandwidth of the control, may be as high as possible due to the selection of special weights for the respective pressure sensor such that the control can take place in the shortest time intervals possible.

The pressure control in the respective pressure-controlled section preferably takes place on the basis of a time average of the measured pressures, wherein the average value is formed over a time period that is identical to or greater than a period of a resonance of a standing pressure wave in the respective pressure-controlled section, and wherein the pressure in the respective pressure-controlled section preferably is essentially maintained constant. The formation of the time average makes it possible to eliminate the potentially still relevant resonances, which depend on the number of pressure sensors, for the adjustment of the regulating devices.

A preferred embodiment is characterized in that the pressure in the respective pressure-controlled section is measured at a first location in a region at the beginning of the respective pressure-controlled section, at a second location that essentially lies in the center of the respective pressure-controlled section and at a third location in a region at the end of the respective pressure-controlled section, wherein the pressure in the respective pressure-controlled section preferably is adjusted on the basis of an arithmetic average value of the pressure at the first, second and third location, wherein the pressure at the first location is during the formation of the average value weighted with one quarter, the pressure at the second location is weighted with one half and the pressure at the third location is weighted with one quarter, and wherein a time average preferably is formed over a time period that is identical to or greater than the period of a fourth resonance of a standing pressure wave in the respective pressure-controlled section. The region at the beginning preferably is located as close as possible to the beginning of the respective pressure-controlled section, i.e. as close as possible to the location, at which exhaust gas from the machine is supplied, and/or the region at the end is located as close as possible to the end of the respective pressure-controlled section, i.e. as close as possible to the regulating device. The beginning of the pressure-controlled section of the supply line particularly refers to the location, at which the pressure-controlled section is connected to the regulating device of the supply line. The beginning of the pressure-controlled section of the exhaust gas line particularly refers to the location, at which the pressure-controlled section is connected to the machine. The end of the pressure-controlled section of the supply line particularly refers to the location, at which the pressure-controlled section is connected to the machine. The end of the pressure-controlled section of the exhaust gas line particularly refers to the location, at which the pressure-controlled section is connected to the regulating device of the supply line. The region at the beginning preferably extends from the beginning of the respective pressure-controlled section up to a location that is spaced apart from the beginning by less than 30 cm, particularly less than 10 cm, and/or the region at the end extends from a location that is spaced apart from the end of the respective pressure-controlled section by less than 30 cm, particularly less than 10 cm, up to the end of the respective pressure-controlled section. It was determined that this arrangement of the pressure sensors and the selection of the weighting is advantageous for canceling the resonances. The first, second and third resonances are eliminated. Due to the special selection of the weights, only the fourth resonance has an effect on the pressure wave, wherein this fourth resonance lies significantly above 100 Hz, for example in an air-filled pipe with a length of 6 m at room temperature, and therefore usually no longer has any negative effects on the pressure control. In addition, a time average preferably is formed over a time period that is identical to or greater than the period of the fourth resonance of a standing wave in the respective pressure-controlled section such that the fourth and higher resonances no longer affect the measurement.

The control on the exhaust gas side and the supply gas side basically follows similar principles. However, there is a significant difference in the resonant frequencies. The temperature on the intake side is known due to the usual conditioning of the combustion gas whereas the temperature of the exhaust gas can change quickly—depending on the operating point of the machine—such that a solution with the aid of a stop filter or comb filter would be much more difficult to realize on the exhaust gas side. According to the invention, stop filters or comb filters may nevertheless be provided in the pressure-controlled section on the supply side, as well as on the exhaust gas side.

With respect to the inventive device, the compressed gas line advantageously has a valve and/or a throttle that preferably can be respectively controlled manually and/or electrically. It is proposed that the compressed gas line is connected to the pressure-controlled section in its respective quarter, preferably in its respective eighth, which is located closer to the regulating device than to the machine, and/or in a region that is spaced apart from the regulating device by less than 30 cm, particularly less than 10 cm. The compressed gas line preferably has a correspondingly high flow resistance such that the mass flow from the compressed gas line is maintained low despite the high pressure difference between the beginning of the compressed gas line and the pressure of the exhaust gas in the exhaust gas line, particularly the pressure within the pressure-controlled section. The flow resistance preferably should be so high that the mass flow from the compressed gas line into the pressure-controlled section amounts at a pressure difference of more than 50 mbar to less than 10 percent, preferably less than 5 percent, of the exhaust gas discharged in the maximum operating mode of the machine. It is particularly preferred that the flow resistance is so high that the mass flow from the compressed gas line into the pressure-controlled section amounts at a pressure difference of more than 100 mbar to less than 10 percent, preferably less than 5 percent, of the exhaust gas discharged in the maximum operating mode of the machine. It is likewise preferred that the compressed gas line has a correspondingly small diameter such that the mass flow from the compressed gas line is maintained low despite the high pressure difference, wherein the diameter preferably is so small that the preferred and particularly preferred characteristics mentioned in connection with the flow resistance are achieved.

In a preferred embodiment of the device, the device comprises a supply line for supplying combustion gas to the internal combustion engine, wherein said supply line has a regulating device, preferably a butterfly control valve or throttle flap, which delimits a pressure-controlled section of the supply line, and wherein the compressed gas line is connected to the supply line upstream of the regulating device of the supply line. It is particularly preferred that the pressure-controlled section of the supply line has a discharge valve, that the supply line has a first gas conveying device, preferably a high-pressure fan, and/or a gas conditioning section, and/or that the exhaust gas line has a second gas conveying device, preferably a fan.

The pressure-controlled section of the supply gas line and/or the exhaust gas line advantageously has more than one pressure sensor, preferably three pressure sensors.

The invention is described in greater detail below with reference to preferred exemplary embodiments that are illustrated in the drawings, but the invention is by no means restricted to the exemplary embodiments shown.

DETAILED DESCRIPTION

Figure 1:
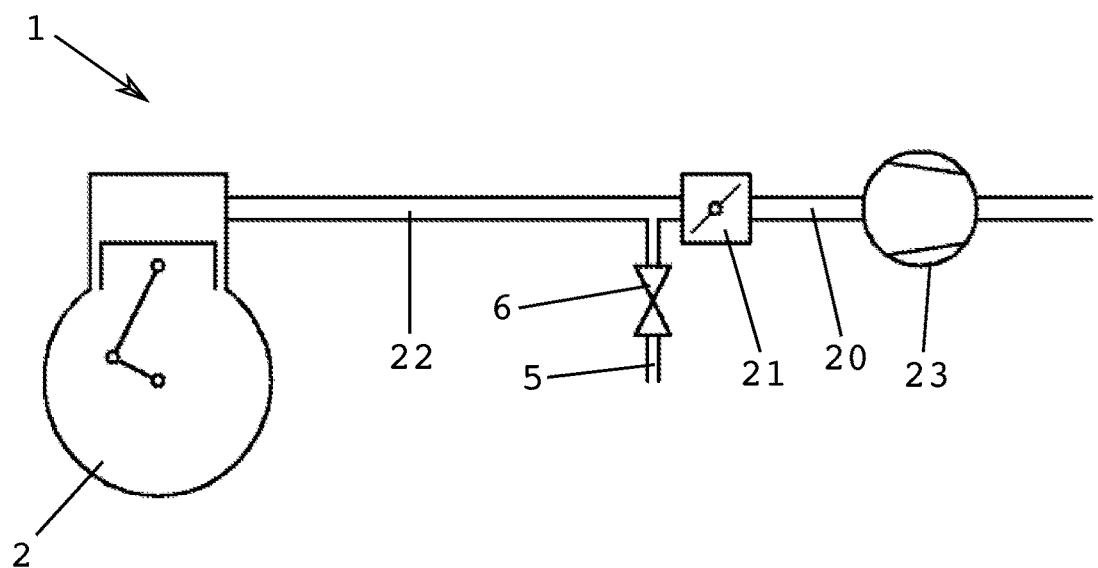
FIG. 1 shows a preferred embodiment of the device for controlling the pressure of the exhaust gas of a machine with a compressed gas line.

FIG. 1 shows a preferred embodiment of the inventive device 1, wherein the exhaust gas is discharged from the machine 2 via the exhaust gas line 20. The device comprises a compressed gas line 5 with a throttle or a valve 6, wherein the compressed gas line 5 advantageously has a high flow resistance. In addition, the exhaust gas line 20 has a gas conveying device 23, preferably a fan, for removing the exhaust gas by suction. The compressed gas line 5 is advantageously located as close as possible to the regulating device 21. The compressed gas line makes available a small gas mass flow, for example from a building pressure line, another gas source, particularly an air source, or another compressor, wherein said gas mass flow contributes to essentially maintaining the pressure in the pressure-controlled section 22 constant despite an optional leakage of the regulating device 21.

Figure 2:
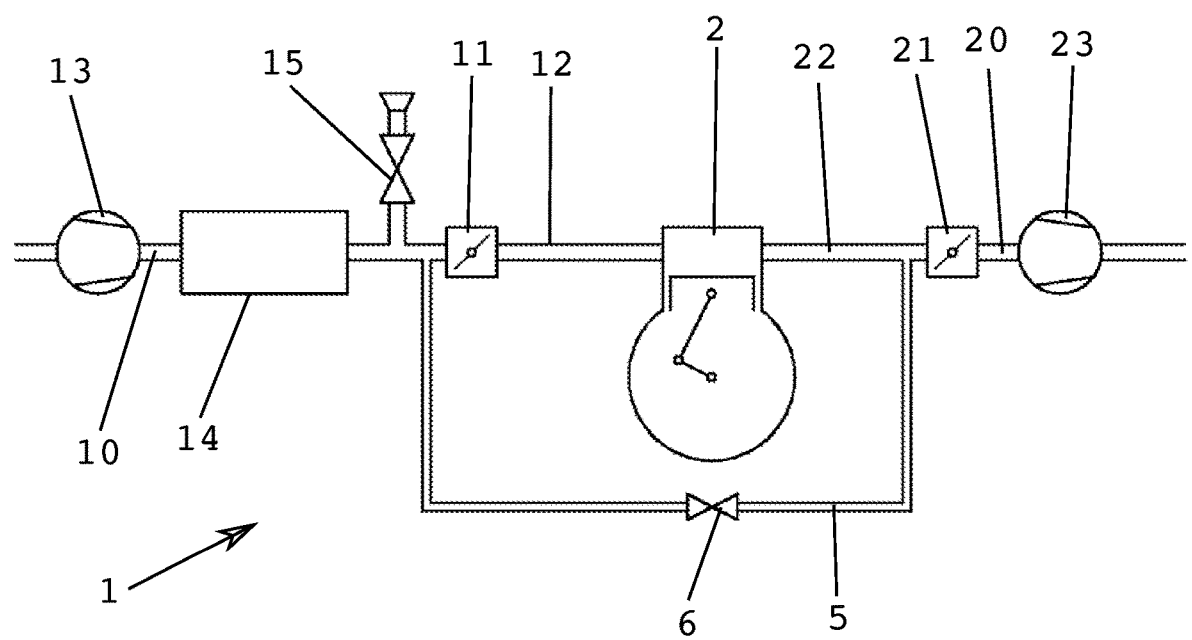
FIG. 2 shows a preferred embodiment of the device for controlling the pressure of the supply gas and the exhaust gas of a machine with a compressed gas line and a gas conditioning section.

FIG. 2 shows a preferred embodiment of the inventive device 1 for controlling the pressure of the combustion gas and/or exhaust gas of a machine 2. In this case, the supply line 10 has a first gas conveying device 13, preferably a high-pressure fan, a gas conditioning section 14 and a discharge valve 15. The gas conveying device 13 blows combustion gas into the supply line 10, wherein said combustion gas is subsequently conditioned in the gas conditioning section 14. The discharge valve 15 regulates the admission pressure and discharges combustion gas, which is not needed by the machine 2, before the combustion gas reaches the pressure-controlled section 12 via the regulating device 11 of the supply line 10.

The exhaust gas line 20 also has a regulating device 21, which delimits a pressure-controlled section 22, as well as a second gas conveying device 23. A compressed gas line 5 with a throttle or a valve 6 connects the supply line 10 to the pressure-controlled section 22 of the exhaust gas line 20 upstream of the regulating device 11, wherein the pressure gradient across the compressed gas line 5 preferably amounts to more than 50 mbar, particularly more than 100 mbar. With respect to the connecting point of the compressed air line 5 to the supply line 10 relative to the regulating device 11 of the supply line 10, the same advantageous requirements as those described above relative to the regulating device 21 of the exhaust gas line 20 may apply.

Gas is conveyed from a section of the supply line 10, which is located upstream of the regulating device 11 of the supply line 10, to the pressure-controlled section 22 of the exhaust gas line 20 via the compressed gas line 5, wherein the mass flow is regulated with a valve or a throttle 6 in the compressed gas line 5.

Figure 3:
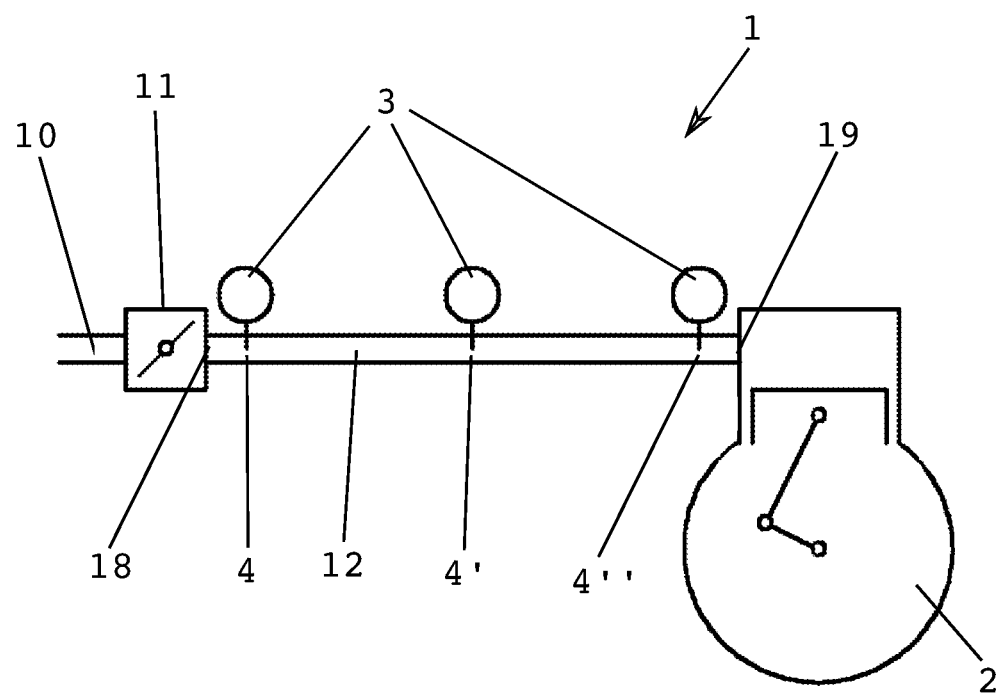
FIG. 3 shows a preferred embodiment of the portion of the device on the supply gas side with three pressure sensors.

FIG. 3 shows an embodiment of the portion of the device 1 for controlling the pressure of the combustion gas and/or exhaust gas of a machine 2 on the supply gas side. In this case, combustion gas is supplied to the machine 2 via a supply line 10. A regulating device 11 on the supply gas side delimits a pressure-controlled section 12 of the supply line 10. The pressure is measured at three locations 4, 4', 4" of the pressure-controlled section 12 by means of pressure sensors 3. The first location 4 lies in a region at the beginning of the pressure-controlled section 12, the second location 4' essentially lies in the center of the pressure-controlled section 12 and the third location 4" lies in a region at the end of the pressure-controlled section 12. In this case, the first location 4 preferably lies as close as possible to the beginning 18 of the pressure-controlled section and the third location 4" lies as close as possible to the end 19 of the pressure-controlled section.

The pressure in the pressure-controlled section 12 is advantageously adjusted on the basis of an arithmetic average value of the pressures at the first, second and third locations 4, 4', 4", wherein the pressure at the first location 4 is during the formation of the average value weighted with one quarter, the pressure at the second location 4' is weighted with one half and the pressure at the third location 4" is weighted with one quarter, and wherein a time average is formed over a time period that is identical to or greater than the period of a fourth resonance of a standing pressure wave in the pressure-controlled section 12.

Figure 4:
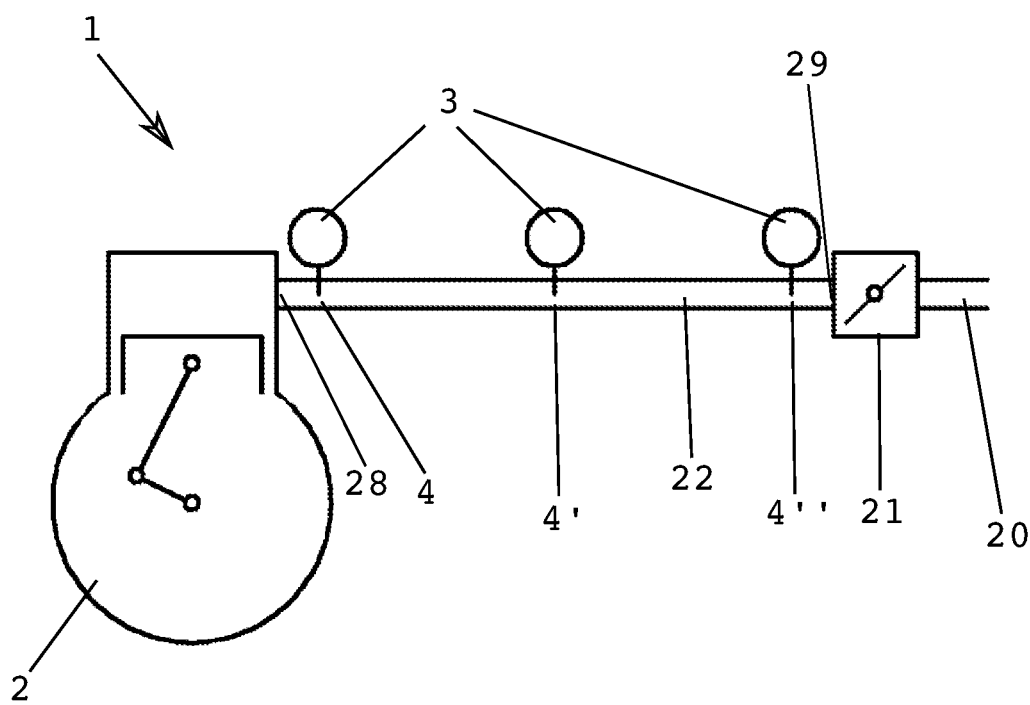
FIG. 4 shows a preferred embodiment of the portion of the device on the exhaust gas side with three pressure sensors.

FIG. 4 shows an embodiment of the portion of the device 1 for controlling the pressure of the combustion gas and/or exhaust gas of a machine 2 on the exhaust gas side. In this case, combustion gas is supplied to the machine 2 via an exhaust gas line 20. A regulating device 21 on the exhaust gas side delimits a pressure-controlled section 22 of the exhaust gas line 20. The further design of the invention is realized as described in connection with FIG. 3. In this case, the first location 4 preferably lies as close as possible to the beginning 28 of the pressure-controlled section and the third location 4" lies as close as possible to the end 29 of the pressure-controlled section.

The exemplary embodiments, which are illustrated in the figures and described with reference to these figures, serve for elucidating the invention and should not be interpreted in a restrictive sense.

The invention claimed is:

1. A method for controlling a pressure of an exhaust gas of a machine, particularly an internal combustion engine, wherein the exhaust gas is discharged from the machine via an exhaust gas line and the exhaust gas line has a regulating device, which delimits a pressure-controlled section of the exhaust gas line, the method comprising:
supplying a gas into the pressure-controlled section of the exhaust gas line via a compressed gas line in a regulated manner such that a pressure in the pressure-controlled section is maintained at a constant value, wherein the compressed gas line supplies the gas into a respective quarter of the pressure-controlled section of the exhaust gas line, which is located closer to the regulating device of the exhaust gas line than to the machine, and/or in a region that is spaced apart from the regulating device by less than 30 cm.

2. The method of claim 1, wherein
a pressure of the gas is supplied at a beginning of the compressed gas line higher than the pressure in the exhaust gas line.

3. The method of claim 1, wherein the gas is supplied with a mass flow, which is lower than a mass flow of the exhaust gas discharged in a maximum operating mode of the machine.

4. The method of claim 1, wherein the regulating device is operated in a mode, in which a mass flow constantly escapes from the pressure-controlled section.

5. The method of claim 1, wherein the compressed gas line supplies the gas into a respective eighth of the pressure-controlled section, which is located closer to the regulating device than to the machine, and/or into a region that is spaced apart from the regulating device by less than 10 cm.

6. The method of claim 1, wherein the compressed gas line has a flow resistance, which is at least so high that a mass flow from the compressed gas line into the pressure-controlled section amounts to less than 10 percent of the exhaust gas discharged in a maximum operating mode of the machine when a difference between the pressure of the gas supplied at the beginning of the compressed gas line and the pressure of the exhaust gas in the exhaust gas line is higher than 50 mbar.

7. The method of claim 1, wherein a combustion gas is supplied to the machine via a supply line, and in that the supply line has a regulating device, which delimits a pressure-controlled section of the supply line, wherein the combustion gas is conveyed from a section of the supply line, which is located upstream of the regulating device of the supply line, to the pressure-controlled section of the exhaust gas line via the compressed gas line.

8. The method of claim 7, wherein combustion gas, which is not needed by the machine, is discharged from the supply line with a discharge valve.

9. The method of claim 8, wherein a pressure in a pressure-controlled section of the supply line is measured at more than one location.

10. The method of claim 9, wherein the pressure in the pressure-controlled section of the supply line is adjusted by controlling the regulating device of the supply line on a basis of a weighted arithmetic average value of pressures measured at multiple locations in the pressure-controlled section of the supply line.

11. The method of claim 10, wherein the pressure in the pressure-controlled section of the supply line is measured at a first location in a region at a beginning of the pressure-controlled section of the supply line, at a second location that lies in a center of the pressure-controlled section of the supply line, and at a third location in a region at an end of the pressure-controlled section of the supply line.

12. The method of claim 7, wherein a pressure in at least one of the pressure-controlled section of the exhaust gas line is measured at more than one location.

13. The method of claim 12, wherein the pressure in the pressure-controlled section of the exhaust gas line is adjusted by controlling the regulating device of the exhaust gas line on a basis of a weighted arithmetic average value of pressures measured at multiple locations in the pressure-controlled section of the exhaust gas line.

14. The method of claim 12, wherein the pressure in the pressure-controlled section of the exhaust gas line is measured at a first location in a region at a beginning of the pressure-controlled section of the exhaust gas line, at a second location that lies in a center of the pressure-controlled section of the exhaust gas line, and at a third location in a region at an end of the pressure-controlled section of the exhaust gas line.

15. The method of claim 1, wherein the regulating device comprises a throttle valve or a throttle flap.

16. A device for controlling a pressure of an exhaust gas of a machine, particularly an internal combustion engine and especially on a test stand, comprising:
an exhaust gas line for discharging the exhaust gas from the machine, wherein said exhaust gas line has a regulating device that delimits a pressure-controlled section,
wherein the pressure-controlled section of the exhaust gas line comprises a compressed gas line for supplying gas in a regulated manner, wherein the compressed gas line is connected to the pressure-controlled section of the exhaust gas line in its respective quarter, which is located closer to a regulating device than to the machine, and/or in a region that is spaced apart from the regulating device by less than 30 cm.

17. The device of claim 16, wherein the compressed gas line has a valve and/or a throttle,
the compressed gas line is connected to the pressure-controlled section of the exhaust gas line in its respective eighth, which is located closer to the regulating device than to the machine, and/or in a region that is spaced apart from the regulating device by less than 10 cm, and/or
the compressed gas line has a flow resistance, which is at least so high that a mass flow from the compressed gas line into the pressure-controlled section of the exhaust gas line amounts to less than 10 percent less than of the exhaust gas discharged in a maximum operating mode of the machine when a difference between a pressure of the gas supplied at a beginning of the compressed gas line and a pressure of the exhaust gas in the exhaust gas line is higher than 50 mbar.

18. The device of claim 16, wherein the device comprises a supply line for supplying a combustion gas to the machine, wherein said supply line has a regulating device that delimits a pressure-controlled section of the supply line, and in that the compressed gas line is connected to the supply line upstream of the regulating device of the supply line.

19. The device of claim 18, wherein the pressure-controlled section of the exhaust gas line has more than one pressure sensor.

20. The method of claim 18, wherein the pressure-controlled section of the supply line has more than one pressure sensor.

* * * * *